Jan. 1, 1952     A. B. SEPPMANN     2,580,851
MASTER CYLINDER RELIEF VALVE
Filed Nov. 20, 1948
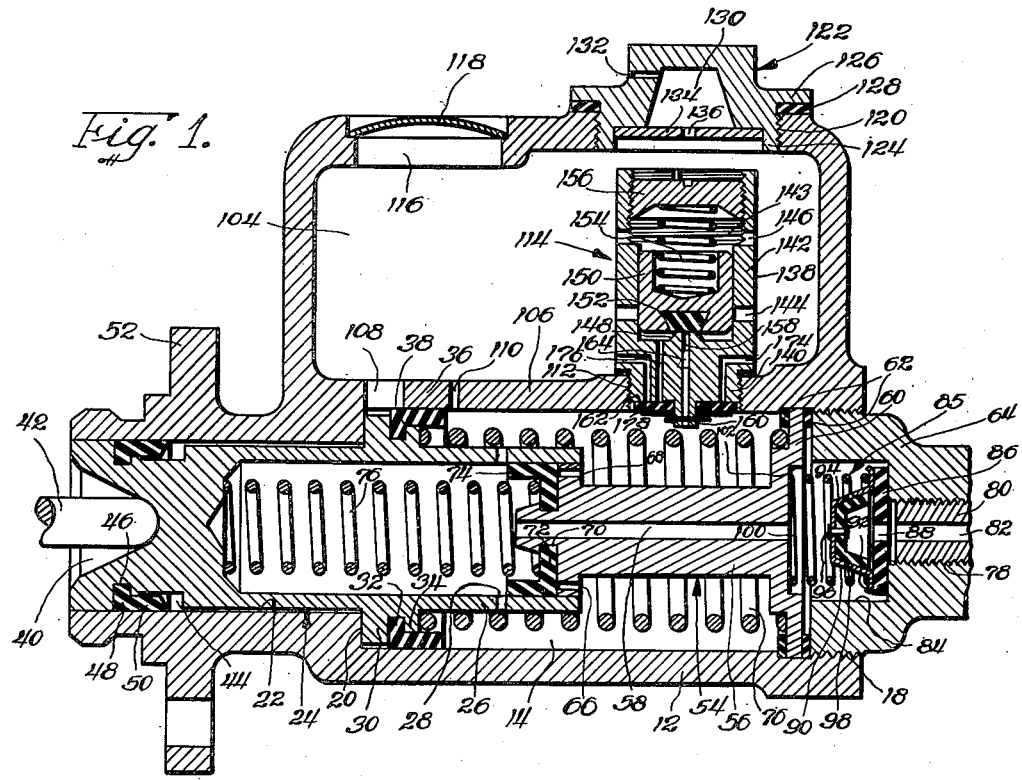
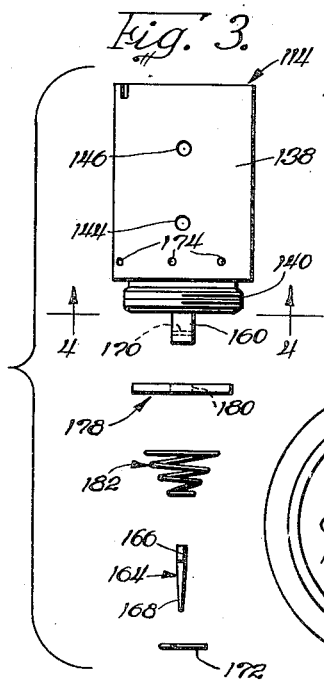
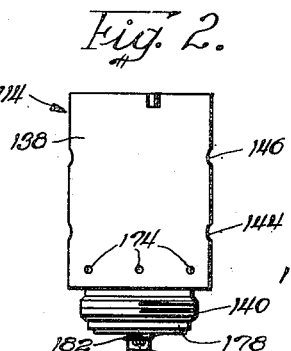
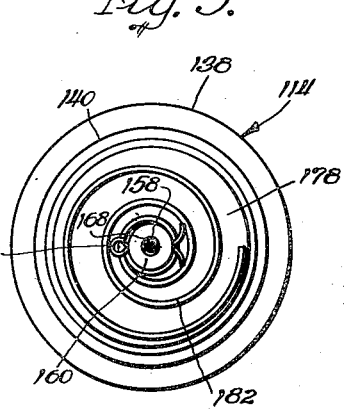
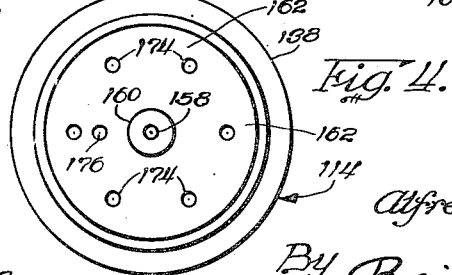
Inventor:
Alfred B. Seppmann.
By Bair & Freeman
Attys Patented Jan. 1, 1952

2,580,851

UNITED STATES PATENT OFFICE 2,580,851

MASTER CYLINDER RELIEF VALVE

Alfred B. Seppmann, Mankato, Minn.

Application November 20, 1948, Serial No. 61,199

4 Claims. (Cl. 277—61)

This invention relates to a relief valve designed primarily for inclusion in a master brake cylinder, although the valve may be incorporated in other devices.

In general, such a master cylinder includes a cylinder proper, a piston in the cylinder for forcing oil from the piston through oil lines to the brakes, and a reservoir having communication with the cylinder proper. On the initial portion of the stroke of the piston, the oil is forced into the brakes rapidly under low pressure, taking up the slack in the brake shoes; after the slack is taken up in the brake shoes, reaction pressure is exerted therefrom, and a portion of the oil in the cylinder proper is forced into the reservoir, and by a special construction and arrangement of the piston, a portion of the oil is forced under high pressure into the brake shoes. The passage between the cylinder proper and the reservoir is controlled by a relief valve.

The present invention has to do with a novel relief valve for controlling the flow of oil between the cylinder proper and the reservoir.

An object of the present invention is the provision of such a relief valve having a novel needling valve control of the oil flowing therethrough.

Another object is the provision of a novel relief valve having an oil passage and a valve closure therefor, and a needling control element separate from said valve closure and disposed in said passage.

In master cylinders, oil must flow from the reservoir into the piston cylinder on the return of the piston from the power stroke.

It is therefore another object of the invention to provide a relief valve having a novel construction for controlling the flow of oil from the reservoir to the piston cylinder.

The relief valve of the present invention includes a valve chamber having passages or ports communicating with the piston cylinder and with the reservoir, and a valve closure in the chamber controlling the flow of oil through the passages.

Still another object is the provision of an additional passage or port communicating between the valve chamber and the piston cylinder for providing for rapid flow of oil from the valve chamber into the piston cylinder on the return of the piston from the power stroke.

A further object is the provision of novel valve means for stopping the flow of oil through said additional passage in the reverse direction from that intended, i. e., from the piston cylinder into the valve chamber.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a longitudinal sectional view of a master cylinder embodying the present invention;

Figure 2 is an elevational view of the relief valve of the present invention;

Figure 3 is an exploded view illustrating the relief valve and certain parts thereof;

Figure 4 is a view taken on line 4—4 of Figure 3; and

Figure 5 is the bottom view of Figure 2.

Referring now in detail to the drawings, the master cylinder in which the relief valve of the present invention is incorporated is shown as a whole in Figure 1; such a master cylinder is employed in such instances as in automobiles and is connected with the braking system where on actuation of the master cylinder oil is forced into the brake lines and the brake shoes are moved to braking position. The master cylinder includes a housing 12 which is preferably in the form of a casting and includes a main cylinder proper 14 open at both ends. At one end is a shoulder 16 in the interior of the cylinder and outwardly of the shoulder 16 is an interiorly threaded portion 18 which is slightly larger than the main cylinder proper. Adjacent the other end of the main cylinder is another shoulder 20 of greater radial extent than the shoulder 16, which forms a reduced cylindrical portion 22 in the main cylinder.

A main movable piston 24 is fitted in the main cylinder, being slidable thereinto through the open end of the cylinder from the right. The main piston 24 includes a hollow cylinder 26 having ports 28 adjacent its inner end. Surrounding the cylinder 26 intermediate the ends thereof is an annular flange 30 which is nearly of the same diameter of the main cylinder 14 but freely slidable therein. Next to the flange 30 is a groove 32 formed by the flange 30 and another flange 34 which is of lesser diameter than the flange 30. A cup leather 36 having an inturned flange 38 surrounds the movable piston with the flange 38 secured in the groove 32. The cup leather 36 provides sealing engagement with the cylinder 14. The left end of the piston 24 is adapted to extend into the reduced diameter cylinder 22 and is provided at its outer end with a cavity 40.

A plunger 42 extends into the cavity 40, the plunger being actuated by the brake pedal of the car. The left end of the movable piston 24 is provided with a peripheral groove 44 having a deeper groove 46, in which is seated the flange 48 of a cup leather 50. The leather 50 bears against the wall of the reduced cylinder 22. Around the left end of the housing 12 is a flange 52 by which the master cylinder as a whole may be mounted in position.

A stationary piston 54 is secured in the opposite end of the main cylinder 14. The piston 54 includes a main portion 56 having a central longitudinal bore 58. One end of the piston 54 is provided with a radial flange 60 on opposite sides of which are sealing gaskets 62. A compression spring 63 is biased between the movable piston 24 and the flange 60 of the stationary piston 54, surrounding a portion of each of the pistons. A fitting 64 having exterior threads is threaded into the threaded portion 18 and against the outer gasket 62 and retains the piston 54 in position in the main cylinder 14. The inner end of the fixed piston 54 extends into the interior of the cylinder 26 which forms a portion of the main piston 24 and is there provided with a flange 66 which is of substantially the same diameter as the inner diameter of the cylinder 26. The flange 66 is provided with a plurality of axially extending ports 68. To the left of the flange 66 is a groove 70 in which is received the flange 72 of a cup leather 74. The leather 74 has sealing engagement with the inner surface of the cylinder 26 and a compression spring 76 is biased between the gasket 74 and the inner end of the hollow of the cylinder 26.

The fitting 64 is provided with a threaded bore 78 in which is threaded an insert 80 having a central bore 82 communicating with a cavity 84 in the fitting 64. A disk 86, such as rubber or other flexible material, is seated against the floor of the cavity 84 and has a central bore 88 in substantial registration with the bore 82. A retarding valve indicated generally at 85 includes the disc 86 and a cup shaped member 90. The cup shaped member 90 has a peripheral flange 92 around its open side adapted to fit against the disc 86. A cup shape flexible member 94, such as rubber, is fitted in the cup shape member 90 and secured thereto as by a rivet 96. The peripheral wall of the member 90 has a plurality of ports 98. A compression spring 100 is compressed between the flange 92 and the fixed piston 54, the latter having a cavity 102 for receiving the spring. The spring 100 biases the retarding valve to the right.

The master cylinder is also provided with a reservoir 104 which is formed as an integral portion of the main housing of the master cylinder. A portion of the housing 12 forming the dividing wall between the cylinder 14 is indicated at 106. The dividing wall 106 is provided with an enlarged port 108 adjacent the shoulder 20 and a smaller bore 110 spaced a short distance therefrom. The wall 106 is also provided with a larger opening 112 having interior threads therein in which is inserted a relief valve 114. The relief valve 114 comprises the present invention and will be described in detail presently. An opening 116 is formed in the reservoir housing in substantial register with ports 108 and 110 and is closed by a snap disc 118. The wall forming the reservoir is also provided with another opening 120 having interior threads and is closed by a cap 112 having a threaded portion 124 threaded into the opening 120. Above the threaded portion is a flange 126 having engagement with a gasket 128 which in turn engages the housing and seals the cap 122 at this point. The cap 122 is provided with a cavity 130 having a small bore 132 leading to atmosphere. The lower end of the cavity is substantially closed by a disc 134 fitted in a recess in the cap. The disc 134 has an opening 136. It will be noted that the opening 120 is in register with the relief valve 114.

The relief valve 114 is essentially a chambered body and includes an enlarged upper portion 138 of cylindrical form and a lower reduced portion 140 having exterior threads and threaded in the opening 112. The upper portion 138 has an interior cavity 143 formed by cylindrical wall 142. Adjacent the bottom of the wall 142 are a plurality of ports 144 and above these ports are additional ports 146 both of which communicate between the interior of the chambered body and the reservoir 104. The floor of the cavity has a central upstanding boss 148. Slidable in the cavity 143 is a cup shape valve closure member 150 having a recess in its underside, in which is fitted a sealing member such as rubber 152. A compression spring 154 has one end seated in the valve closure member 150 and its other end is engaged by a cap 156 threaded in the upper interiorly threaded end of the wall 142 which is otherwise open.

The lower end of the chambered body 138 is provided with a central relief passage 158 which is bored through the boss 148 and through the chambered body and through a projection 160 which extends downwardly from the under face 162 of the portion 140 of the valve. A needling pin 164 is disposed in the relief passage 158. Reference to Figure 3 will show the needling pin 164 having an upper cylindrical portion 166 and a lower tapered portion 168. The upper cylindrical portion 166 is of lesser diameter than the relief passage 158. The downwardly extending projection 160 is provided with a transverse hole 170 for the reception of a cotter key 172. The hole 170 and the cotter key 172 are of lesser diameter than the relief passage 158 to permit the flow of oil through the passage. The cotter key 172 prevents the needling pin 164 from dropping out of the relief passage.

In the lower part of the chambered body 138 are a plurality of return passages 174 which communicate with the reservoir 104, bypassing the interior 143 of the chambered body and open out the flat under face 162 of the relief valve, where they are adapted to communicate with the interior of the main cylinder proper 14.

A supplemental passage 176 communicates between the interior of the chambered body 138, and the cylinder 14, opening out through the flat under face 162.

The reference numeral 178 indicates a valve member which is in the form of a disc of flexible material such as rubber or a rubber compound. The disc 178 is provided with a central opening 180 adapted to fit over the projection 160 whereby the disc seats against the flat under face of the chambered body. A spiral spring 182 having a normal shape as shown in Figure 3 is seated on the projection 160 and compressed against the valve disk 178 and held in position by the cotter key 172.

*Operation*

Figure 1 illustrates the parts of the master cylinder when in retracted position. When the operator presses the brake pedal, the plunger 42 forces the movable piston 24 to the right against the main compression spring 63 and the compression spring 76. The cylinders 14 and 26 are full of oil and when the movable piston 24 is forced to the right, the oil in the cylinder 28 is forced through the bore 58 and out of the master cylinder. Since the cylinder 14 is of greater diameter than the cylinder 26, there is greater displacement in the cylinder 14, and the excess oil in the latter is forced through the ports 68 and past the cup leather 74 which flexes under the pressure of the oil. Thus a considerable volume of oil passes through the bore 58 into the braking system, i. e., a volume greater than the displacement within the cylinder 26.

The spring 154 in the relief valve 114 is given a predetermined compression by setting the cap 156. The valve closure member 150 is seated against the boss 148 and closes the relief passage 158. In the initial movement of the piston 24, the pressure of the spring 154 is great enough to prevent any oil from passing through the relief passage 158. Also in the initial movement of the piston, the reaction of the brake shoes is not great, this portion of the movement being utilized to take up the slack in the brake shoes. When the brake shoes engage the brake drums, considerably greater reaction pressure is formed, and this reaction pressure is exerted through the oil and through the relief passage 158, and when the pressure is great enough it raises the valve closure member 150 against the action of the spring 154. When the latter action takes place the oil in the cylinder 14 instead of passing through the ports 68 passes through the relief passage 158 and the pressure exerted on the brake shoes is only that caused by the displacement in the cylinder 26. The retarding valve 85 permits the passage of oil in both directions. When the brakes are being applied the oil from the port 58 passes through the holes 98 and flexes the flexible member 94 and then passes through the bore 82 into the brake lines. If the operator wishes to create sudden and successive impulses he permits the main piston to be retracted and immediately reapplies the brake. During these momentary movements of the piston, the spring 100 prevents the retarding valve from immediately opening, and thereby enables additional quantities of oil to pass from the cylinder 14 into the cylinder 26. However when the brake is released, the force of the oil returning from the brake line, after an interval of time, compresses the spring 100 and permits the oil to return into the master cylinder. The excess oil in the lines passes through the ports 28.

When oil passes through the relief passage 158 when the brakes are applied, as explained above, it tends to raise the needling pin 164. The oil also engages the under face of the valve closure member 150 and raises the latter, whereby the oil passes into the cavity 143 and when sufficient oil enters the cavity the valve closure member is raised above the ports 144 and the oil then passes into the reservoir. After the valve closure member 150 is raised sufficiently high, the needling pin 164 extends partially above the boss 148, and the tapered portion 168 produces a restricting action to the passage of oil. Thus the flow of oil through the relief passage 158 can be more accurately controlled due to the variable action of the tapered portion of the pin.

In the retracting action of the movable piston 24 the pressure is reduced in the cylinder 14 and oil then passes from the reservoir through the return passages 174 into the cylinder 14. The flexible disc 178 is flexed downwardly under such flow of oil and permits the oil to pass into the cylinder, but oil is prevented from flowing in the opposite direction by the flexible valve disc 178.

The supplemental passage 176 forms an essential of the present invention. In the retracting movement of the piston 24, pressure is relieved under the main closure element 150 and while most of the oil otherwise would flow through the relief passage 158 there would be a certain portion remaining below the upper end of the boss 148. This oil is thus permitted to return through the supplemental passage 176 and permit the valve closure member to seat quickly on the boss 148, and quickly close the upper end of the relief passage 158.

The flat under face 162 of the relief valve also forms an essential of the present invention. The valve disc 178 is adapted to readily seat against the face 162 and thereby prevent the flow of oil through the passages 174 and 176 in the wrong directions. The spiral spring 182 is adapted to effectively retain the valve disc 178 against the flat face 162.

The relief valve is of general utility and may be incorporated in devices other than master cylinders for brakes; accordingly the claims may be construed accordingly, and for purposes of interpreting the claims, the flat under face 162 which is exposed to the interior of the cylinder 14, is considered the "first surface," and the outer cylindrical surface of the wall 142 of the chambered body which is exposed to the interior of the reservoir 104, is considered the "second surface."

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A relief valve for mounting in an opening between a pair of chambers, comprising, in combination, a chambered body having a first surface exposed to the interior of one of the chambers and a second surface exposed to the interior of the other chamber, said chambered body having a passage leading from the interior thereof and opening through said first surface, said chambered body having ports leading from the interior thereof and opening through said second surface, a closure member in said chambered body adapted to close said passage and ports, said chambered body having return passages opening through both of said surfaces and by-passing the interior of said chambered body, said chambered body having a supplemental passage leading from the interior thereof and opening through said first surfaces, a flexible disc secured to said chambered body over said return passages and supplemental passage and subject to pressure exerted against adjacent said first surface, and spring means secured to said chambered body and biasing said flexible disc into position closing said return passages and supplemental passage.

2. A relief valve for mounting in an opening between a pair of chambers, comprising, in combination, a chambered body having a first surface exposed to the interior of one of the chambers and a second surface exposed to the interior of the other chamber, said chambered body having a passage leading from the interior thereof and opening through said first surface, said chambered body having ports leading from the interior thereof and opening through said second surface, a closure member in said chambered body adapted to close said passage and ports, said chambered body having return passages opening through both of said surfaces and bypassing the interior of said chambered body; said chambered body having a supplemental passage leading from the interior thereof and opening through said first surface, said first surface being a flat face, said return passages and supplemental passage opening through said flat face, said flat face having a central projection thereon, a flexible disc having a central opening secured to said projection and engageable with said flat face, and a spiral spring secured to said projection and engageable with said flexible disc.

3. A relief valve for mounting in an opening between a pair of chambers, comprising, in combination, a chambered body having a first surface exposed to the interior of one of the chambers and a second surface exposed to the interior of the other chamber, said chambered body having a passage leading from the interior thereof and opening through said first surface, said chambered body having ports leading from the interior thereof and opening through said second surface, a closure member in said chambered body adapted to close said passage and ports, said chambered body having return passages opening through both of said surfaces and bypassing the interior of said chambered body, said first surface being a flat face, said return passages opening through said flat face, a central projection on said flat face, a flexible disc having a central opening secured to said central projection and engageable with said flat face, and a spiral spring secured to said central projection and engageable with said flexible disc and adapted to bias said flexible disc into engagement with said flat face.

4. A relief valve for mounting in an opening between a pair of chambers, comprising, in combination, a chambered body having a first surface exposed to the interior of one of the chambers and a second surface exposed to the interior of the other chambers, said first surface being a flat face, a central projection on said flat face, said chambered body having a relief passage leading from the interior thereof and opening through said first surface, said relief passage terminating in a boss on the inner surface of said chambered body, said chambered body having ports leading from the interior thereof and opening through said second surface, a valve closure in said chambered body adapted to close said ports and having a resilient surface engageable with said boss for closing said relief passage, a tapered pin slidably positioned in said relief passage, said chambered body having a plurality of return passages opening through both of said surfaces and bypassing the interior of said chambered body, said chambered body having a supplemental passage leading from the interior thereof and opening through said first surface, said return passages and said supplemental passage opening through said flat face, a flexible disc having a central opening secured to said projection and engageable with said flat face, a spiral spring secured to said projection and engageable with said flexible disc, and a key in a transverse hole in said projection for securing said spiral spring in position and retaining said tapered pin in said relief passage, said pin being of a thickness less than the transverse dimension of said relief passage.

ALFRED B. SEPPMANN.

REFERENCES CITED

The following references are of record in the file of this patent:

UNITED STATES PATENTS

| Number | Name | Date |
| --- | --- | --- |
| 2,166,742 | Lambert | July 18, 1939 |
| 2,170,851 | Carroll | Aug. 29, 1939 |
| 2,173,979 | Picut | Sept. 20, 1939 |
| 2,216,847 | Loweke | Oct. 8, 1940 |
| 2,374,235 | Roy | Apr. 24, 1945 |

FOREIGN PATENTS

| Number | Country | Date |
| --- | --- | --- |
| 528,131 | Germany | of 1928 |